United States Patent
MacNeil et al.

(10) Patent No.: US 9,371,059 B2
(45) Date of Patent: Jun. 21, 2016

(54) WHEEL GUIDE DEVICE

(71) Applicant: Ryko Canada, Inc., Barrie (CA)

(72) Inventors: Daniel J. MacNeil, Barrie (CA); Ereth McKnight-MacNeil, Vars (CA)

(73) Assignee: Ryko Canada, Inc., Barrie, CA (US)

( * ) Notice: Subject to any disclaimer, the term of this patent is extended or adjusted under 35 U.S.C. 154(b) by 0 days.

(21) Appl. No.: 14/231,012

(22) Filed: Mar. 31, 2014

(65) Prior Publication Data

US 2015/0274135 A1   Oct. 1, 2015

(51) Int. Cl.
*B60S 3/00* (2006.01)

(52) U.S. Cl.
CPC ... *B60S 3/004* (2013.01); *B60S 3/00* (2013.01)

(58) Field of Classification Search
CPC .............. E01B 5/00; E01B 5/18; B60S 3/00; B60S 3/004; B60S 3/04; B61B 12/00; B61B 12/02; B61B 13/12
USPC .......................... 104/106, 107, 165, 162, 168, 104/172.1–172.3
See application file for complete search history.

(56) References Cited

U.S. PATENT DOCUMENTS

| | | | |
|---|---|---|---|
| 3,526,193 A | 9/1970 | Vani | |
| 3,744,433 A | 7/1973 | Bernardi | |
| 4,104,971 A | 8/1978 | Savard | |
| RE30,026 E | 6/1979 | Hanna et al. | |
| 4,690,065 A | 9/1987 | Belanger et al. | |
| 4,856,646 A | 8/1989 | Sjostrand | |
| 4,864,936 A | 9/1989 | Rietsch, Jr. | |
| 4,981,151 A | 1/1991 | Larson et al. | |
| 5,042,392 A | 8/1991 | Brethorst | |
| 5,730,061 A | 3/1998 | Stufflebeam | |
| 6,076,212 A | 6/2000 | Feld | |
| 6,422,153 B1 | 7/2002 | Reitsch, Jr. | |
| 7,302,894 B2 | 12/2007 | Belanger et al. | |
| 7,530,317 B1 * | 5/2009 | Belanger et al. | 104/172.3 |
| 8,028,628 B2 | 10/2011 | Ennis | |
| 8,132,666 B2 | 3/2012 | McAlister et al. | |
| 2006/0225601 A1 | 10/2006 | Belanger et al. | |
| 2010/0200373 A1 | 8/2010 | McAlister et al. | |
| 2011/0115650 A1 | 5/2011 | Wimmer | |
| 2011/0155188 A1 | 6/2011 | Wimmer | |

OTHER PUBLICATIONS

Webpage for Sonny's The CarWash Factory re: Sonny's Over Under Conveyor (2 pages), https://www.sonnysdirect.com/mainsei/contentmanagement/home.jsf?wec-appid=Sonnys_Direct&wec-locale=en_US&cm=1878 (extracted Sep. 10, 2013).
Brochure for Istobal USA "Magic Touch a Rail Tunnel Car Wash Systems" (undated; printed Mar. 28, 2013).

* cited by examiner

Primary Examiner — R. J. McCarry, Jr.
(74) Attorney, Agent, or Firm — Smart & Biggar (57) ABSTRACT

A device for guiding a wheel along a track of a vehicle wash, comprises a support frame, a bracket and a bumper. The bracket is positioned adjacent to the track and has flanges extending upwardly and toward the center of the track defining a channel. The bumper has a mounting portion received in the channel and a wheel contacting portion with a tapered bearing surface. The mounting portion is received in the channel so that the tapered bearing surface extends at an angle upwardly and toward the center of the track.

24 Claims, 10 Drawing Sheets

United States Patent

WHEEL GUIDE DEVICE

FIELD

The present invention relates to vehicle wash systems and, particularly, to wheel guide devices for vehicle wash systems.

BACKGROUND

Some types of vehicle wash systems typically have a conveyor or track along which vehicles travel through the wash system. To keep vehicles on the intended path, such conveyors or tracks are typically provided with devices to guide one or more of a vehicle's wheels.

Unfortunately, wheel guide devices may cause damage to a vehicle, for example, when metal components of a wheel guide device contact the wheels, suspension or body of the vehicle. Accordingly, wheel guide devices may include components formed of relatively soft materials, to avoid damaging vehicles. However, such soft components may be difficult to install, and may be mounted on metal components which themselves may contact and damage vehicles.

SUMMARY

In an aspect, there is provided a device for guiding a wheel along a track of a vehicle wash, comprising: a support frame; at least one bracket positioned adjacent to the track, said at least one bracket comprising two flanges extending upwardly and toward a center line of the track, the flanges defining a channel; at least one bumper, the at least one bumper having a mounting portion received in the channel and a wheel-contacting portion extending from the mounting portion upwardly and toward a center line of the track, the wheel-contacting portion having a tapered cross-sectional shape.

In another aspect, there is provided a device for guiding a wheel along a track of a vehicle wash, comprising: a support frame; an inboard bracket positioned adjacent to the track an inboard side, the inboard bracket extending on an angle from the support frame upwardly and toward a center line of the track; an inboard bumper, the inboard bumper having a mounting portion and a wheel-contacting portion with tapered cross-sectional shape, the mounting portion mounted to the inboard bracket so that the wheel-contacting portion extends from the mounting portion upwardly and toward a center line of the track.

In a further aspect, there is provided a bumper for a wheel guide device of a vehicle wash, comprising: a web portion configured to be received in a channel of a bracket; a wheel-contacting portion extending from the web portion, the wheel-contacting portion wider than the web portion and having a tapered cross-sectional shape.

BRIEF DESCRIPTION OF THE DRAWINGS

In the figures, which illustrate by way of example only, embodiments of this invention.

DETAILED DESCRIPTION

Figure 1:
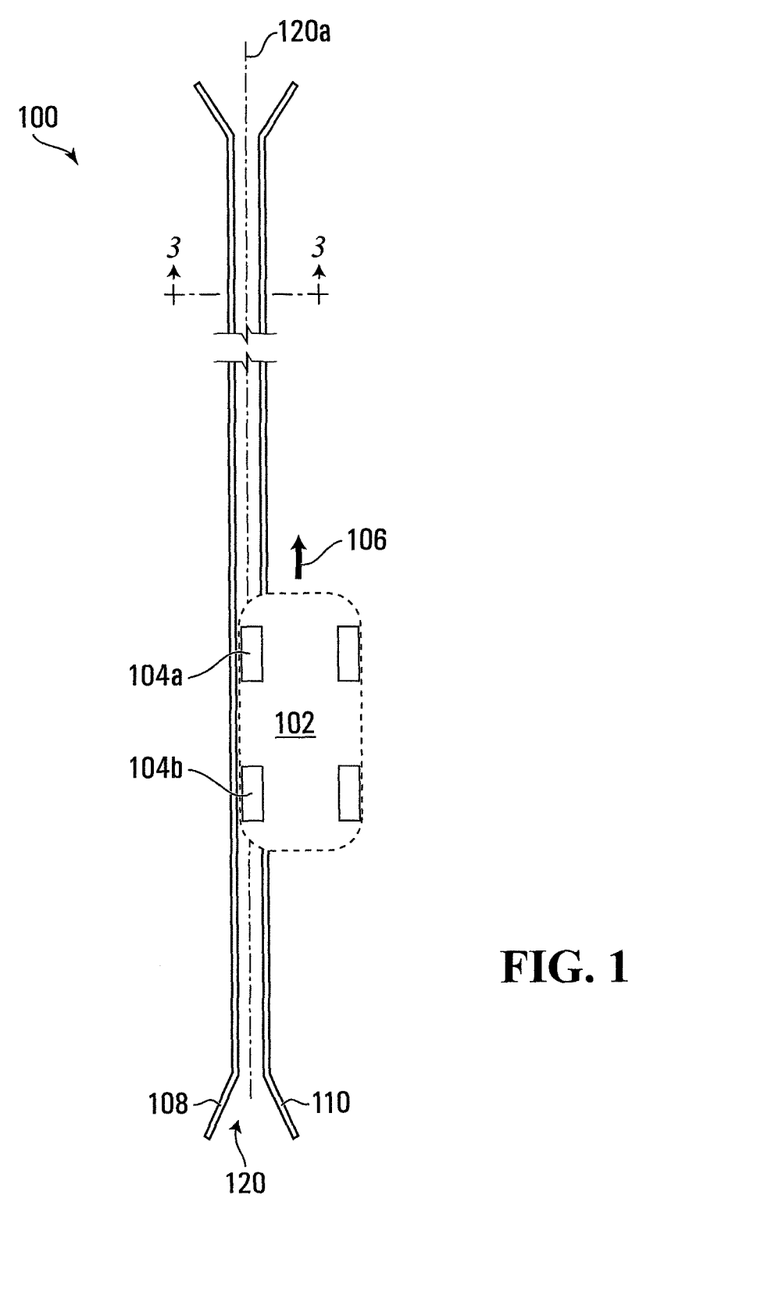
FIG. 1 is a simplified top elevation view of a track of a vehicle wash system including wheel guide devices.

FIG. 1 depicts a track 100 of a vehicle wash system. Track 100 provides a path along which a left-hand side front wheel 104a and rear wheel 104b (individually and collectively, wheels 104) of a vehicle 102 can travel through the vehicle wash system. Wheels 104 may, for example, be moved along track 100 using a conveyor (not shown), thus causing vehicle 102 to move through the vehicle wash system along a desired course 106. Suitable conveyors are known to those skilled in the art. Alternatively, vehicle 102 may move under its own power.

Ensuring that vehicle 102 travels along the desired course 106 may in turn ensure that vehicle 102 is correctly located relative to vehicle wash equipment and may avoid damage of equipment and contribute to safety of vehicle occupants or wash system operators. Accordingly, track 100 has wheel guide devices 108, 110 to direct wheels 104 and assist in keeping wheels 104 within track 100. Wheel guide device 108 is located on the outboard side of track 100 and wheel guide device 110 is located on the inboard side of track 100. As used herein, the terms "outboard" and "inboard" refer to directions transverse to the direction of travel of vehicle 102. "Outboard" refers to the direction away from the center of the vehicle and "inboard" refers to the direction toward the center of the vehicle. Thus, the outboard side of track 100 lies outside the periphery of vehicle 102 and the inboard side of track 100 lies underneath vehicle 102.

Figure 2:
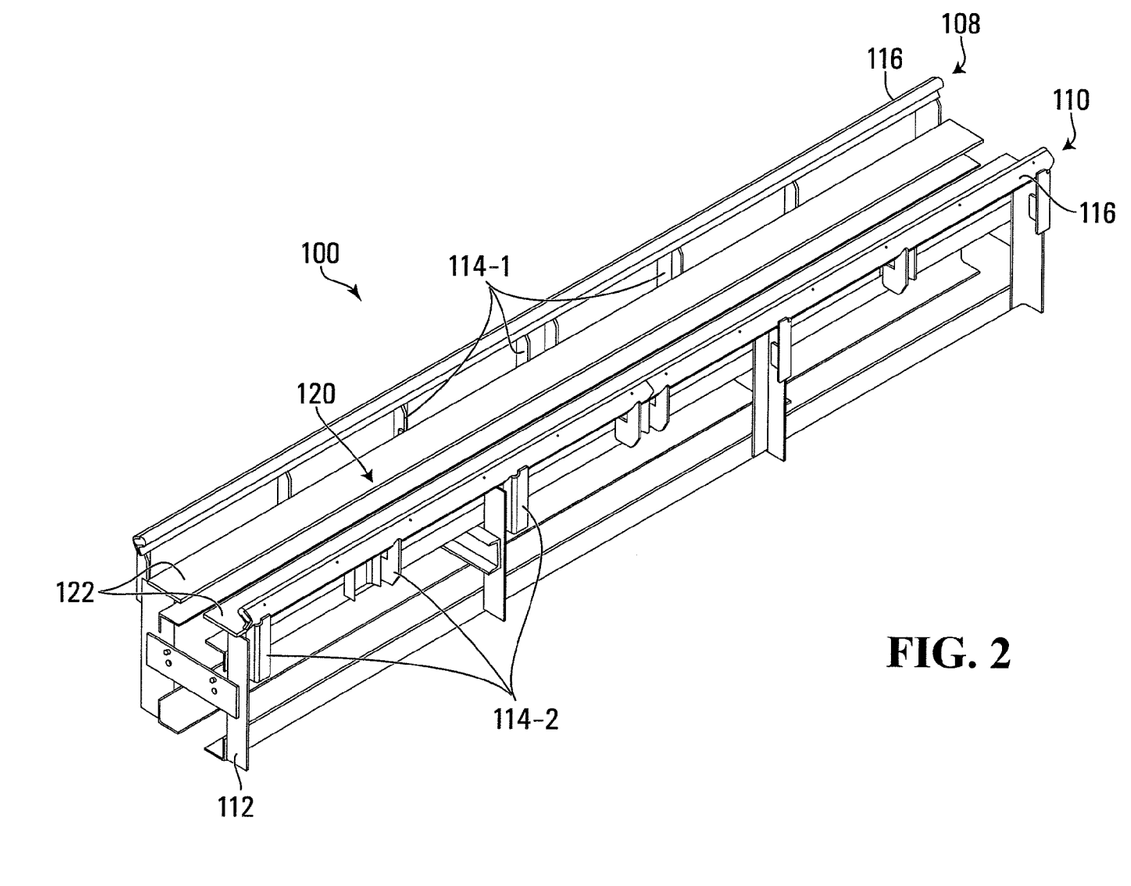
FIG. 2 is a partial perspective view of the track of FIG. 1.

A portion of track 100 is shown in greater detail in FIG. 2. Track 100 has a frame 112, which supports a plurality of plates 122 to define a rolling surface 120 along which a vehicle's wheels can travel. Track 100 has a center line 120a (FIG. 1) which longitudinally bisects the rolling surface 120. Track 100 may be installed in a building such that rolling surface 120 lies approximately at floor level. Parts of track 100 may therefore sit below floor level, e.g. in a pit or tunnel (not shown).

Wheel guide devices 108, 110 are mounted to frame 112 and include a plurality of stanchions 114-1, 114-2 (collectively, stanchions 114) which are connected to frame 112.

Stanchions 114 may, for example, be welded to frame 112 or may be connected using bolts or other appropriate fasteners. Stanchions 114-1 are connected to an outboard side of frame 112 and stanchions 114-2 are connected to an inboard side of frame 112. Stanchions 114-1 and stanchions 114-2 each support a bumper assembly 116.

Figure 3:
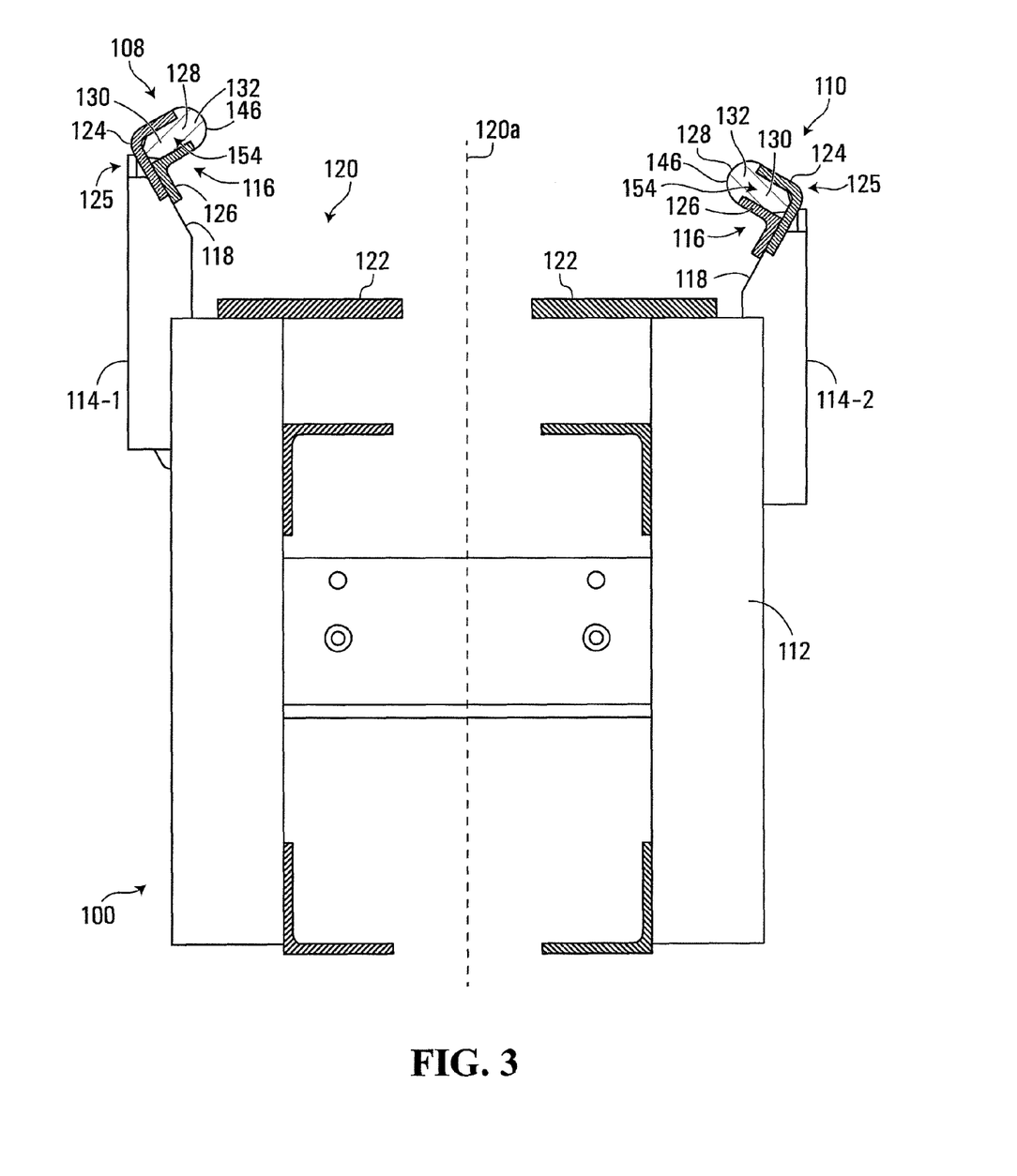
FIG. 3 is a cross-sectional view of the track of FIG. 1, along line 3-3 shown in FIG. 1.

Wheel guide devices 108, 110 are shown in greater detail in FIG. 3. As depicted, stanchions 114 extend generally vertically upwardly from frame 112. Stanchions 114 have mounting surfaces 118 angled upwardly and toward center line 120a of rolling surface 120. As depicted, stanchions 114-1, 114-2 are similar, apart from being mounted on opposite sides of frame 112. Alternatively, stanchions 114-1, 114-2 may differ. Mounting surfaces 118 of stanchions 114-1 on the outboard side of track 100 may be higher than mounting surfaces 118 of stanchions 114-2 on the inboard side of track 100. For example, as depicted, stanchions 114-1 on the outboard side of track 100 are positioned higher on frame 112 than stanchions 114-2 on the inboard side of track 100. Alternatively, stanchions 114-1 may be taller than stanchions 114-2.

Each wheel guide device 108, 110 includes a bumper assembly 116 which includes a bumper 128 and a bracket 125 formed from an upper angle iron 124 and a lower angle iron 126. Each upper angle iron 124 is attached (e.g., welded) to stanchions 114-1 or 114-2. Each lower angle iron 126 is attached (e.g., welded) to a corresponding upper angle iron 124. So assembled, upper angle irons 124 and lower angle irons 126 define brackets 125. Each bracket 125 has a channel 154 extending generally perpendicularly from the mounting surface 118 to which the bracket is attached. That is, each channel 154 extends upwardly and toward center line 120a of rolling surface 120.

Bumpers 128 have mounting webs 130 and wheel-contacting ends 132. As depicted, wheel-contacting ends 132 are generally semi-circular in cross-section (see FIGS. 6E, 6G, 6I) and define a generally cylindrical surface. Alternatively, wheel-contacting ends 132 may have other cross-sectional shapes. For example, a wheel-contacting end 132 may define an elliptical curve or may have another cross-sectional shape tapering in width with increasing distance from web 130. Mounting webs 130 are received in channels 154 defined by upper angle irons 124 and lower angle irons 126 so that bumpers 128 extend upwardly and towards the rolling surface 120.

Wheel-contacting ends 132 of bumpers 128 define curved bearing surfaces 146 for contacting a wheel of a vehicle. Bumpers 128 may be positioned at a height to primarily contact the vehicle's tires. Typically, bumpers 126 are positioned between 3 and 6 inches above rolling surface 120. A bumper on the inboard side of track 100 may be positioned lower than a bumper on the outboard side of track 100. In an example, a bumper 128 on the outboard side of track 100 may be positioned 5.75 inches above rolling surface 120 and a bumper 128 on the inboard side of track 100 may be positioned 3 inches above rolling surface 120. As best shown in FIG. 3, stanchions 114, mounting surfaces 118, upper angle irons 124 and lower angle irons 126 are configured so, when mounted to upper angle irons 124, lower angle irons 126, bumpers 128 extend upwardly and laterally toward center line 120a of rolling surface 120. That is, wheel-contacting ends 132 extend upwardly and toward center line 120a. Thus, curved bearing surfaces 146 of bumpers 128 are positioned vertically above and laterally adjacent to rolling surface 120.

Frame 112, stanchions 114 and plates 122 may be formed from any suitable metallic material such as mild steel. At least some of parts of frame 112, stanchions 114 and plates 122 may be treated to provide corrosion resistance. For example, components may be painted, or galvanized. Additionally or alternatively, at least some parts may be formed of materials with some degree of corrosion resistance. For example, at least some parts may be formed from stainless steel or aluminum. In embodiments in which components are attached by welding, such components may be formed from materials which are capable of being welded together, as will be apparent to those skilled in the art.

Figures 4, 5:
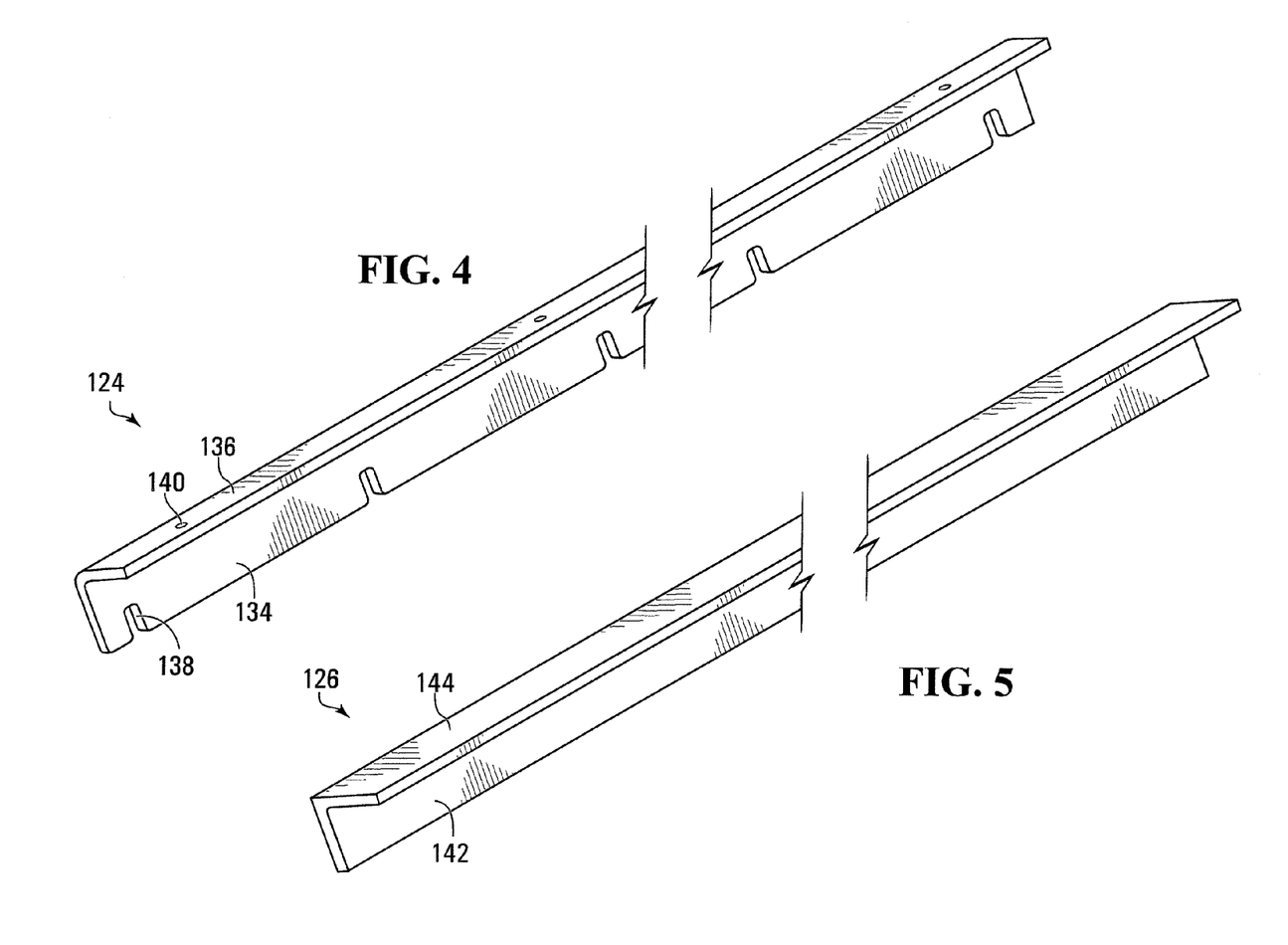
FIG. 4 is a perspective view of an angle iron of the track of FIG. 1.
FIG. 5 is a perspective view of another angle iron of the track of FIG. 1.

FIG. 4 depicts an upper angle iron 124 in greater detail. Upper angle iron 124 is a bracket with a base 134 and a flange 136 extending from base 134 at approximately a 90 degree angle. Base 134 may have a plurality of slots 138 therein. As is further described below, slots 138 may be used to weld a lower angle iron 126 to upper angle iron 124. Flange 136 may have a plurality of holes 140 therethrough. Holes 140 may be spaced apart at an even interval along the length of flange 136. As is further described below, holes 140 may receive fasteners to secure bumper 128.

FIG. 5 depicts a lower angle iron 126 in greater detail. Lower angle iron 126 is a bracket with a base 142 and a flange 144 extending from base 142 at approximately a 90 degree angle.

Upper angle iron 124 and lower angle iron 126 may be formed, for example, from mild steel and may be treated (e.g., painted or galvanized) for corrosion resistance. Alternatively, either or both of upper angle iron 124 and lower angle iron 126 may be formed from another suitable material, such as aluminum or plastic. In use, upper angle iron 124 and lower angle iron 126 may be subjected to significant forces, for example, due to vehicle wheels contacting wheel guide devices 108, 110. Accordingly, upper angle iron 124 and lower angle iron 126 are constructed so as to be capable of withstanding such forces. As will be apparent, to provide sufficient strength, larger volumes of material may be required if upper angle iron 124 and lower angle iron 126 are constructed of plastic or aluminium rather than steel.

Upper angle iron 124 and lower angle iron 126 may be identical in length. Base 134 of upper angle iron 124 may be the same size as base 142 of lower angle iron 126. Flange 136 of upper angle iron 124 may be slightly larger than flange 144 of lower angle iron 126 so that when a lower angle iron 126 is installed to an upper angle iron 124, the ends of flanges 136, 144 are generally flush with one another (see FIG. 3).

Figures 6A, 6B, 6C:
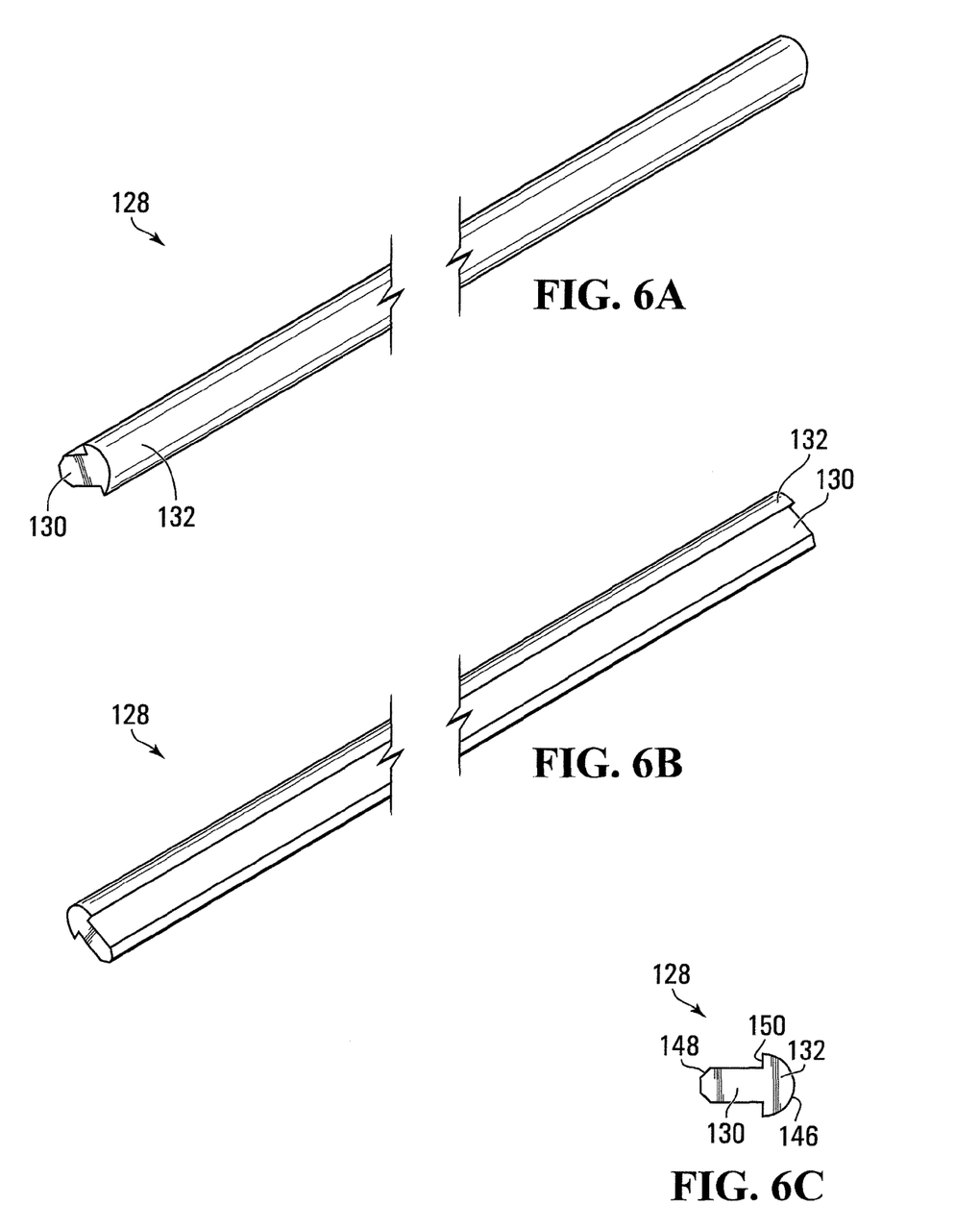
FIGS. 6A-6B are perspective views of a bumper of the track of FIG. 1.
FIG. 6C is a side elevation view of the bumper of FIGS. 6A-6B.
Figure 6D:
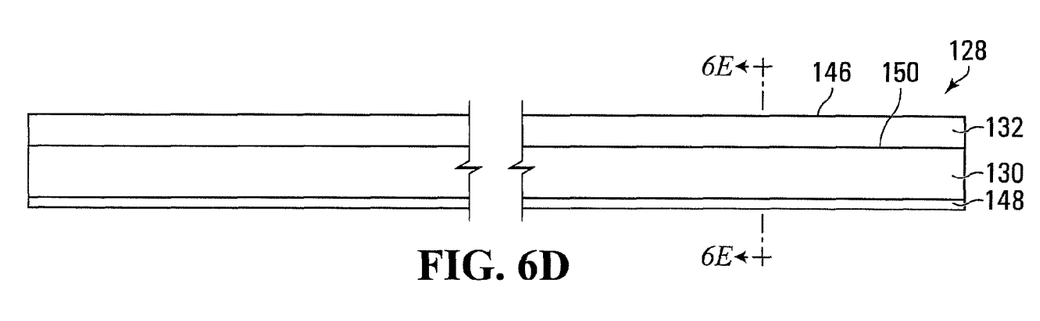
FIG. 6D is a top elevation view of the bumper of FIGS. 6A-6B.
Figure 6E:
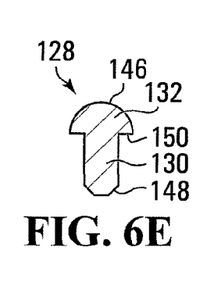
FIG. 6E is a cross-sectional view of the bumper of FIGS. 6A-6B along line 6E-6E shown in FIG. 6D.
Figure 6F:
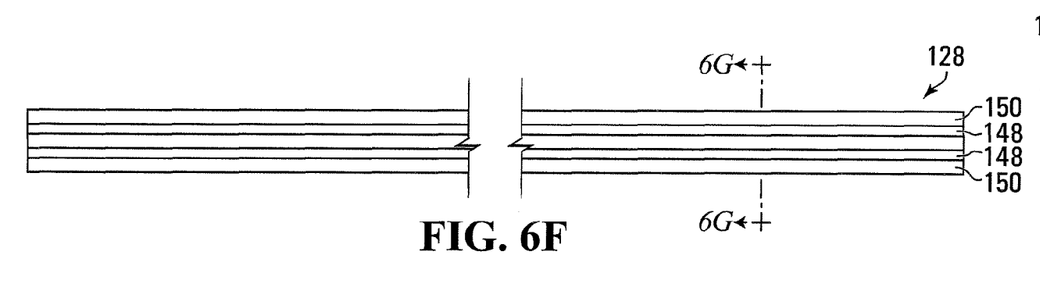
FIG. 6F is a rear elevation view of the bumper of FIGS. 6A-6B.
Figure 6G:
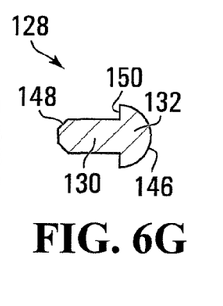
FIG. 6G is a cross-sectional view of the bumper of FIGS. 6A-6B along line 6G-6G shown in FIG. 6F.
Figure 6H:
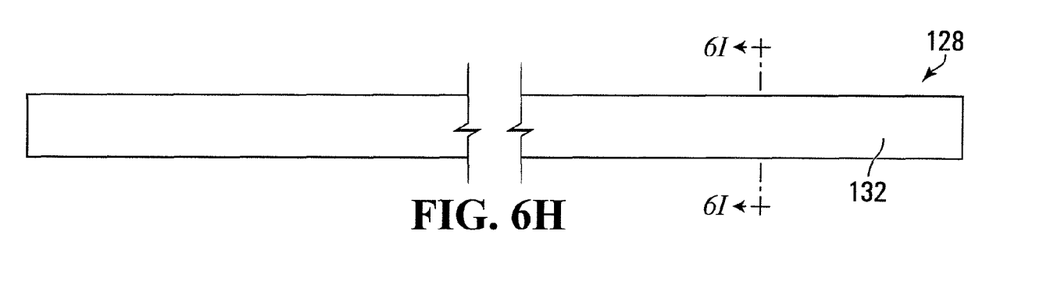
FIG. 6H is a front elevation view of the bumper of FIGS. 6A-6B.

FIGS. 6A-6I depict the design of bumper 128 in greater detail. FIGS. 6A and 6B are perspective views of bumper 128, FIG. 6C is an end elevation view, FIG. 6D is a top elevation view, FIG. 6F is a rear elevation view and FIG. 6H is a front elevation view. The bottom elevation view of bumper 128 is the same as the top elevation view depicted in FIG. 6D.

As noted above, bumper 128 has a mounting web 130 and a wheel-contacting end 132. Wheel-contacting end 132 is wider than mounting web 130 and defines a bearing surface 146. Wheel-contacting end 132 has a tapered cross-sectional shape to limit friction in the event of contact with a wheel. As depicted, wheel-contacting end 132 is shaped to define a generally cylindrically curved bearing surface 146. Mounting web 130 is configured so that mounting web 130 may be received in a channel 154 and mounted thereto. Mounting web 130 has beveled surfaces 148 at its end to ease assembly of bumper 128 and upper angle iron 124, lower angle iron 126. Mounting web 130 may have a plurality of holes 152 therethrough, spaced apart at an interval matching that of holes 140 (FIG. 4). Bumper 128 may be the same length as upper angle iron 124, lower angle iron 126, or may be a different length.

Wheel-contacting end 132 of bumper 128 is wider than mounting web 130 and defines shoulders 150. When bumper 128 is installed into a channel 154, shoulders 150 overhang and cover the ends of flange 136 of upper angle iron 124 and flange 144 of lower angle iron 126. When installed, wheel-contacting end 132 and bearing surface 146 extend upwardly and closer to center line 120a of rolling surface 120, relative to other components of bumper assemblies 116. Shoulders 150 of wheel-contacting end 132 cover upper angle iron 124, lower angle iron 126. Thus, shoulders 150 overhang the angle irons so that shoulders 150 are positioned above and closer to rolling surface 120 than the angle irons. Thus, a wheel 104 or other component of a vehicle 102 traveling along track 100 is likely to contact cylindrical bearing surface 146 rather than other parts of bumper assemblies 116.

Figure 6I:
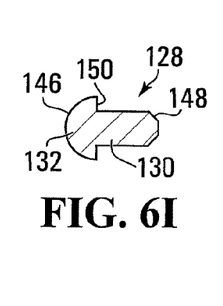
FIG. 6I is a cross-sectional view of the bumper of FIGS. 6A-6B along line 6I-6I shown in FIG. 6H.

As is best shown in FIGS. 6E, 6G and 6I, bumper 128 may have a symmetrical cross-sectional shape. As will be apparent, bumper 128 is reversible mountable on either the outboard or inboard side of track 100. That is, bumper 128 may be installed on either an outboard (e.g. left) or inboard (e.g. right) side of track 100 so that wheel-contacting portion 132 and bearing surface 146 extend upwardly and toward center line 120a of rolling surface 120.

Bumper 128 may be formed from a polymer material or other material that is sufficiently soft to avoid scratching wheels, bodywork or other components of a vehicle. The material may be resiliently deformable to dampen or absorb impacts from vehicle 102. The material of bumper 128 may be selected so that the curved bearing surface 146 provides a relatively low-friction interface when a tire is brought into contact with bumper 128. In some embodiments, bumper 128 may be formed from a relatively hard polyurethane material. Other suitable bumper materials will be resistant to corrosive chemicals, have low moisture absorption, low friction coefficient and high impact resistance.

FIGS. 7-10 depict steps of assembling the wheel guide devices 116 of track 100.

Figure 7:
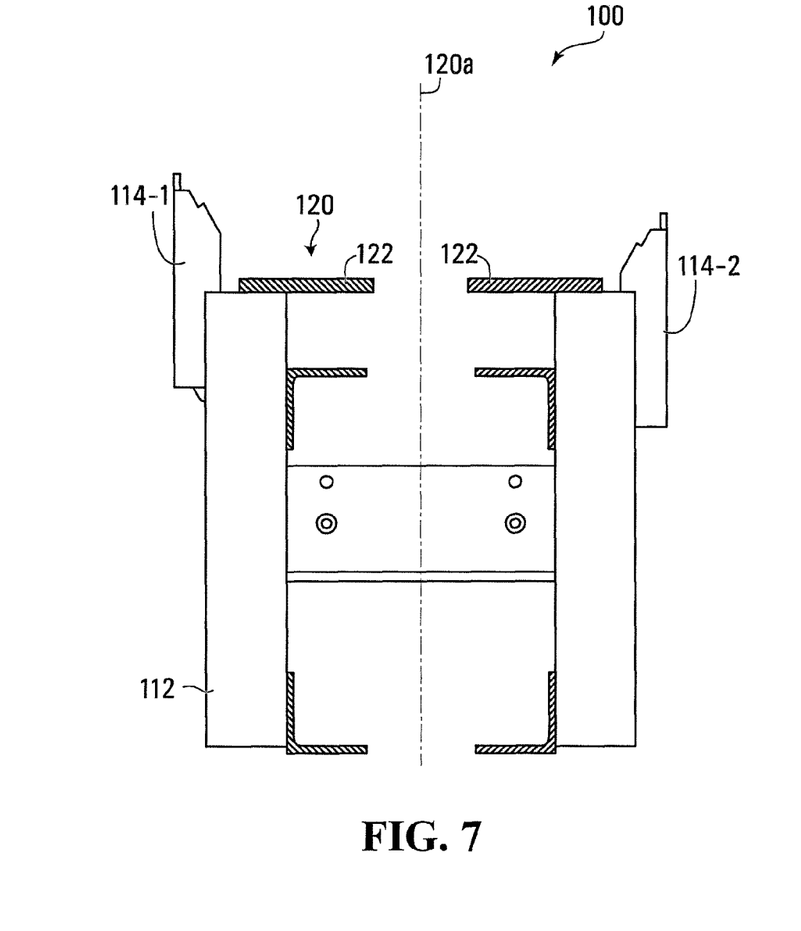
FIG. 7 is a cross-sectional view of the track of FIG. 1, along line 3-3 shown in FIG. 1, at a first stage of assembly.

As shown in FIG. 7, after construction of frame 112, stanchions 114-1 and 114-2 are installed. As depicted, stanchions 114-1 and 114-2 are welded to members of frame 112. However, stanchions 114-1 and 114-2 may alternatively be attached to frame 112 using fasteners (e.g., bolts).

Stanchions 114-1, 114-2 are attached to members of frame 112 so that mounting surfaces 118 are above and laterally adjacent rolling surface 120 at a number of locations along the length of track 100. In some embodiments, stanchions 114-1, 114-2 may generally be spaced at even intervals along the length of rolling surface 120. In some embodiments, stanchions 114-1, 114-2 may be spaced apart at intervals of approximately 40 inches. Stanchions 114-1 on the outboard side of frame 112 are installed at identical height and lateral location relative to one another, so that their mounting surfaces 118 are aligned. Likewise, stanchions 114-2 are positioned at identical heights and lateral locations so that their respective mounting surfaces 118 are aligned with one another. Stanchions 114-1 are positioned higher on frame 112 relative to stanchions 114-2. Thus, mounting surfaces 118 of stanchions 114-1 are likewise positioned higher than mounting surfaces 118 of stanchions 114-2.

Figure 8:
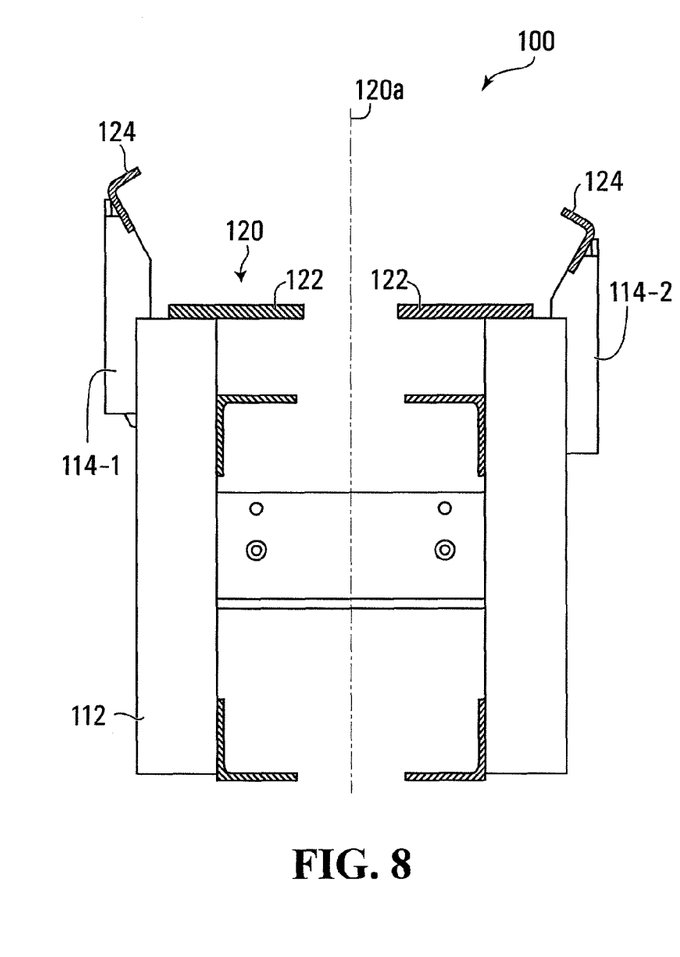
FIG. 8 is a cross-sectional view of the track of FIG. 1, along line 3-3 shown in FIG. 1, at a second stage of assembly.

Upper angle irons 124 are installed on stanchions 114 on each side of frame 112. Specifically, bases 134 of upper angle irons 124 are positioned against mounting surfaces 118 of stanchions 114. As depicted, upper angle irons 124 are welded to stanchions 114. However, upper angle irons 124 may alternatively be attached to stanchions 114 using fasteners.

Each upper angle iron 124 spans and is attached to a plurality of stanchions 114-1 or 114-2. One or more upper angle irons 124 may be installed end-to-end on each side of frame 112 so that, collectively, upper angle irons 124 span all or substantially all of the length of rolling surface 120 on both sides.

Figure 9:
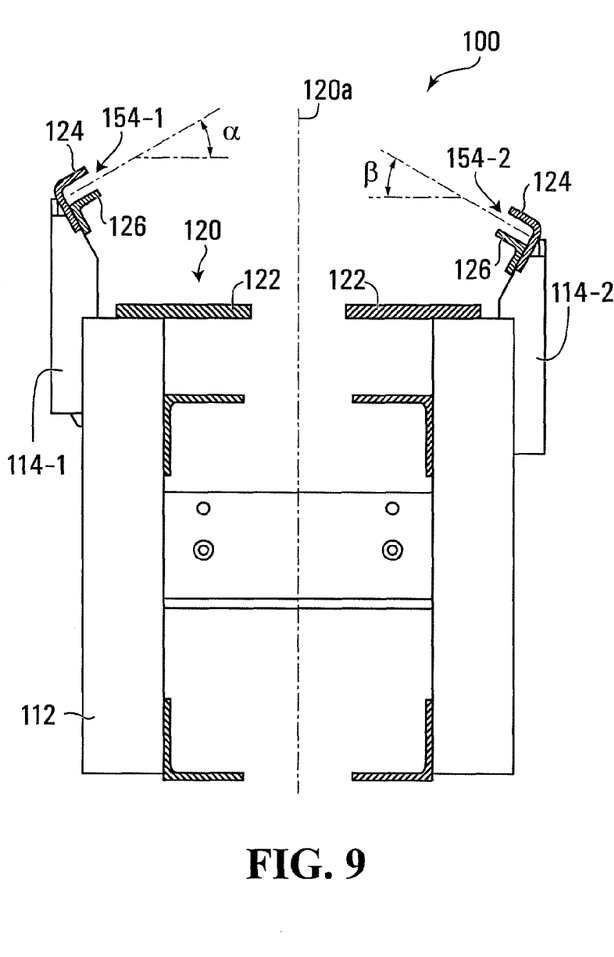
FIG. 9 is a cross-sectional view of the track of FIG. 1, along line 3-3 shown in FIG. 1, at a third stage of assembly.

As shown in FIG. 9, lower angle irons 126 are installed against upper angle irons 124, with bases 142 of lower angle irons 126 positioned against bases 134 of upper angle irons 124. Lower angle irons 126 are fixed to upper angle irons 124 by plug welding through slots 138.

As upper angle irons 124 and lower angle irons 126 are the same length, each lower angle iron 126 is installed to a corresponding upper angle iron 124. Like upper angle irons 124, lower angle irons 126 may be installed end-to-end and one or more may be installed on each side of frame 112 so that collectively, both upper angle irons 124 and lower angle irons 126 define brackets 125 which span all or substantially all of the length of rolling surface 120 on both inboard and outboard sides.

As is best shown in FIG. 9, the installation of lower angle irons 126 to upper angle irons 124 defines brackets 125 with upwardly-opening channels 154. Lower angle irons 126 and upper angle irons 124 on the outboard side of frame 112 form a channel 154-1. Lower angle irons 126 and upper angle irons 124 on the inboard side of frame 112 form a channel 154-2 (collectively, channels 154).

Channels 154 are angled to open upwardly and laterally toward rolling surface 120, that is, toward center line 120a. As stanchions 114-1 are positioned higher than stanchions 114-2, channel 154-1 is likewise higher than channel 154-2.

Channel 154-1 opens upwardly and toward center line 120a at an angle $\alpha$ to horizontal. Channel 154-2 opens upwardly at an angle $\beta$ to horizontal. Bumpers 128 in channels 154-1, 154-2, likewise extend at angles $\alpha$, $\beta$ to horizontal. Angles $\alpha$, $\beta$ may typically be within the range of 20 to 60 degrees. In an example, angles $\alpha$, $\beta$ may be approximately 30 degrees. Angles $\alpha$, $\beta$ may be the same, or may differ from one another.

Figure 10:
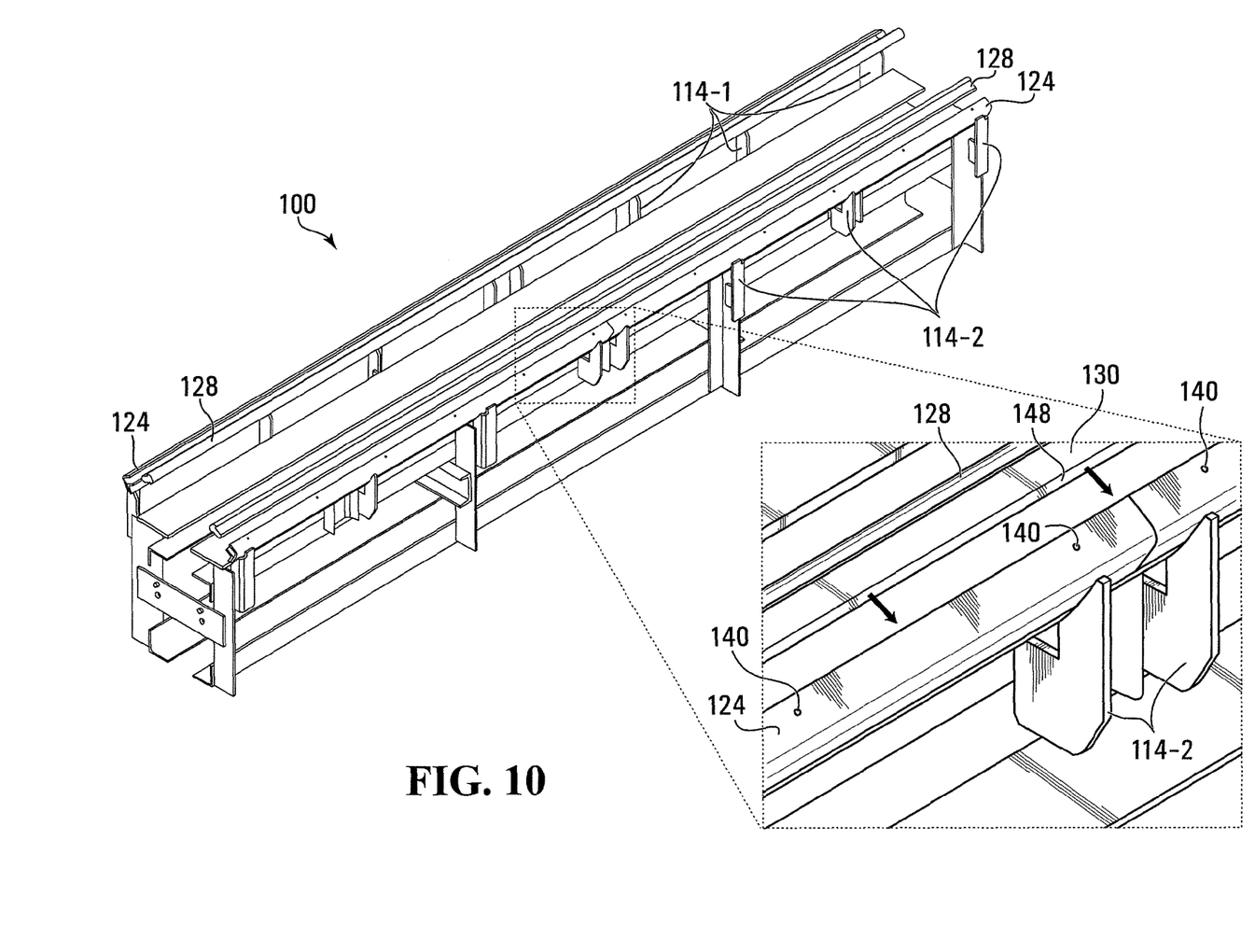
FIG. 10 is a perspective view of the track of FIG. 1, at a fourth stage of assembly.

As shown in FIG. 10, bumpers 128 are installed to brackets 125 by inserting the mounting web 130 of each bumper 128 into a channel 154. One or more bumpers 128 may be installed on each side of frame 112 so that bumpers 128 span all or substantially all of the length of rolling surface 120 on both sides.

Fasteners such as self-tapping screws may be installed through holes 140 of upper angle irons 124 and may bore into bumpers 128 to secure bumpers 128 within channels 154.

Figure 11:
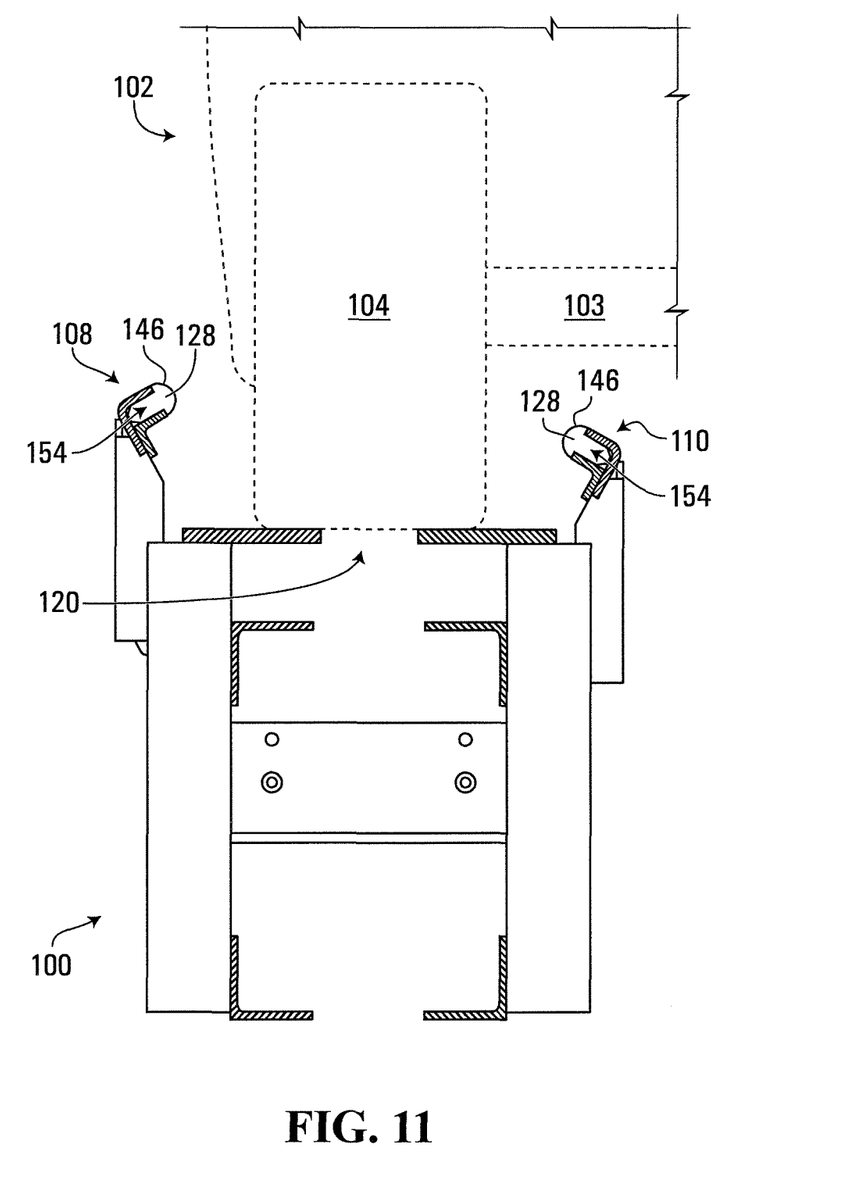
FIG. 11 is a cross-sectional view of the track of FIG. 1, along line 3-3 shown in FIG. 2, with a vehicle.

FIG. 11 shows a cross sectional view of completed track 100 along line 3-3 (FIG. 1), with a vehicle 102 shown in broken line. As a wheel 104 of vehicle 102 travels along track 100, it may weave slightly towards one side or the other of the track. Such weaving may cause wheel 104 to contact wheel guides 108 or 110, which may restrain the lateral movement of wheel 104, keeping it within track 100. As will be apparent, wheel 104 may contact curved bearing surface 146 of a bumper 128 before contacting any other part of wheel guides 108, 110. Contact with curved bearing surface 146 may exert sufficient force on the wheel 104 to direct wheel 104 back towards the center of track 100. Accordingly, vehicle 102 may be maintained on the desired path along track 100 and unintended contact between vehicle 102 and track 100 may be avoided. As bumper 128 may be formed from a relatively soft material, damage to wheel 104 may be avoided. Moreover, as bumper 128 is formed of a relatively slick material and due to the tapered cross-sectional shape of wheel-contacting end 132, defining a curved of bearing surface 146, friction between bumper 128 and wheel 104 may be relatively low. Thus, wheel guides 108, 110 may maintain wheel 104 within track 100 without excessive drag on wheel 104. Conveniently, limiting friction between bumper 128 and wheel 104 may reduce wear and risk of damage on both bumper 128 and wheel 104.

Angle irons 124, 126 extend from stanchions 114 upwards and laterally toward rolling surface 120, that is, toward center line 120a. Thus, channels 145 defined by angle irons 124, 126 and bumpers 128 received in channels 154 likewise extend upwardly and at an angle laterally toward rolling surface 120, that is, toward center line 120a. Thus, wheel guide devices 108, 110 are arranged to provide a relief angle to avoid components other than curved bearing surfaces 146 of bumpers 128 contacting vehicle 102. In particular, the relief angle at which angle irons 124, 126 are positioned provides clearance for non-wheel components of vehicle 102, such as suspension components 103. In other words, bearing surface 146 is positioned at a location close to wheel 104, while other components of wheel guide devices 108, 110 are positioned below and generally farther away from vehicle 102. This may reduce the chance of damage to vehicle components or to track 100 due to unintended contact with the vehicle.

As described above, upper angle irons 124 and lower angle irons 126 are fixed together by plug welding through slots 138. In other embodiments, bases 142 of lower angle irons 126 may have holes corresponding to slots 138 and fasteners may be inserted therethrough.

As described above, bumpers 128 are secured within channels 154 by driving screws through holes 140 into bumpers 128. In other embodiments, webs 130 of bumpers 128 or flanges 144 of lower angle irons 126 may have holes corresponding to holes 140 and fasteners may be inserted therethrough.

In other embodiments, upper angle irons 124 and lower angle irons 126 may be welded together and attached to stanchions 114 and bumpers 128 may be inserted and secured in channels 154 to define a sub-assembly which may then be attached to frame 112 by bolting or welding stanchions 114 thereto.

As described above, bumpers 128 are installed by inserted mounting webs 130 into channels 154 defined between pairs of angle irons 124, 126. However, in other embodiments, angle irons 124, 126 may be replaced by a single U-bracket oriented to define a channel oriented to open upwardly and at an angle laterally toward rolling surface 120 that is, toward center line 120a. In other embodiments, one of angle irons 124, 126 may be omitted and bumpers 128 may instead be bolted or screwed to a single angle iron. For example, lower angle iron 126 could be omitted and bumper 128 bolted or screwed only to upper angle iron 124.

The configuration of wheel guide devices 108, 110 may provide sufficient strength to withstand impact from wheels 104 of a vehicle 102, and yet may limit the possibility of damage to components of the vehicle. Specifically, stanchions 114 and angle irons 124, 126 may provide considerable strength to wheel guide devices, while the positioning and configuration of angle irons 124, 126 and bumpers 128 may guard against unintended contact of a vehicle with metal components of wheel guide devices 108, 110 while limiting the amount of bumper material required.

Other possible modifications will be apparent to skilled persons. The invention, therefore, is defined by the claims.

What is claimed:

1. A device for guiding a wheel along a track of a vehicle wash, comprising:
   a support frame;
   at least one bracket positioned adjacent to said track, said at least one bracket comprising two flanges extending upwardly and toward a center line of said track at an angle to horizontal between 20 degrees and 60 degrees, said flanges defining a channel; and
   at least one bumper, said at least one bumper having a mounting portion received in said channel and a wheel-contacting portion extending from said mounting portion upwardly and toward a center line of said track at said angle to horizontal, said wheel-contacting portion having a tapered cross-sectional shape.

2. The device of claim 1, wherein said mounting portion comprises a web, said web narrower than said wheel contacting portion so that said wheel-contacting portion defines shoulders covering end portions of said flanges of said at least one bracket.

3. The device of claim 2, wherein said web has a beveled end.

4. The device of claim 1, wherein said at least one bracket comprises a first angle iron and a second angle iron attached to said first angle iron.

5. The device of claim 1, wherein said at least one bracket comprises an outboard bracket positioned adjacent to said track on an outboard side and an inboard bracket positioned adjacent to said track on an inboard side, and wherein said at least one bumper comprises an outboard bumper with a mounting portion received in said channel of said outboard bracket, and an inboard bumper with a mounting portion received in said channel of said inboard bracket.

6. The device of claim 5, wherein said outboard bracket and said inboard bracket are mounted atop stanchions having mounting surfaces angled upwardly and toward a center line of said track.

7. The device of claim 6, wherein said outboard bracket is positioned vertically higher than said inboard bracket.

8. The device of claim 1, wherein said at least one bumper is formed of a polymer material.

9. The device of claim 1, wherein said at least one bumper has a symmetrical vertical cross-section.

10. The device of claim 1, wherein said wheel-contacting portion defines a curved bearing surface.

11. A device for guiding a wheel along a track of a vehicle wash, comprising:
    a support frame;
    an inboard bracket positioned adjacent to said track on an inboard side, said inboard bracket extending on an angle to horizontal between 20 degrees and 60 degrees from said support frame upwardly and toward a center line of said track;
    an inboard bumper, said inboard bumper having a mounting portion and a wheel-contacting portion with tapered cross-sectional shape, said mounting portion mounted to said inboard bracket so that said wheel-contacting portion extends from said mounting portion upwardly and toward a center line of said track at said angle to horizontal.

12. The device of claim 11, further comprising:
    an outboard bracket positioned adjacent to said track on an outboard side, said outboard bracket extending on an angle from said support frame upwardly and toward a center line of said track;
    an outboard bumper, said outboard bumper having a mounting portion and a wheel-contacting portion with a curved bearing surface, said mounting portion mounted to said outboard bracket so that said wheel-contacting portion extends from said mounting portion upwardly and toward a center line of said track;
    wherein each of said outboard bumper and said inboard bumper is reversibly mountable to either one of said inboard bracket and said outboard bracket so that said wheel-contacting portion extends from said mounting portion upwardly and toward a center line of said track.

13. The device of claim 12, wherein each of said inboard bracket and said outboard bracket defines a channel, and said wheel-contacting portions of said inboard bumper and said outboard bumper are configured to be received in said channels.

14. The device of claim 13, wherein each said mounting portion comprises a flange having a beveled end.

15. The device of claim 13, wherein each said channel opens upwardly and towards a center line of said track.

16. The device of claim 12, wherein each one of said inboard and outboard brackets comprises a first angle iron and a second angle iron attached to said first angle iron.

17. The device of claim 12, wherein said outboard bracket is positioned vertically higher than said inboard bracket.

18. The device of claim 17, wherein said outboard bracket is mounted atop at least one outboard stanchion and said inboard bracket is mounted atop at least one inboard stanchion, each of said at least one outboard stanchion and said at least one inboard stanchion defining mounting surfaces angled upwardly and toward said track.

19. The device of claim 12, wherein said outboard bracket and said wheel-contacting portion of said outboard bracket extends at an angle between 20 and 60 degrees to horizontal.

20. The device of claim 12, wherein said inboard bumper is formed of a polymer material.

21. The device of claim 12, wherein said inboard bumper has a symmetrical vertical cross-section.

22. The device of claim 11, wherein said wheel-contacting portion defines a curved bearing surface.

23. A bumper for a wheel guide device of a vehicle wash, comprising:
 a web portion configured to be received in a channel of a bracket;
 a wheel-contacting portion extending from said web portion, said wheel-contacting portion wider than said web portion and having a tapered cross-sectional shape.

24. The bumper of claim 23, wherein said wheel-contacting portion defines a curved bearing surface.

\* \* \* \* \*